(12) United States Patent
Armbruster et al.

(10) Patent No.: US 12,174,124 B2
(45) Date of Patent: Dec. 24, 2024

(54) CALIBRATION OF A DIGITAL CAMERA FOR USE AS A SCANNER

(71) Applicant: Immundiagnostik AG, Bensheim (DE)

(72) Inventors: Franz Paul Armbruster, Bobenheim-Roxheim (DE); Ben John, Bensheim (DE); Felix Walzer, Bensheim (DE); Thorsten Knoeller, Bensheim (DE)

(73) Assignee: Immundiagnostik AG, Bensheim (DE)

( * ) Notice: Subject to any disclaimer, the term of this patent is extended or adjusted under 35 U.S.C. 154(b) by 171 days.

(21) Appl. No.: 17/909,729

(22) PCT Filed: Feb. 19, 2021

(86) PCT No.: PCT/EP2021/054106
§ 371 (c)(1),
(2) Date: Sep. 6, 2022

(87) PCT Pub. No.: WO2021/180442
PCT Pub. Date: Sep. 16, 2021

(65) Prior Publication Data
US 2023/0013247 A1    Jan. 19, 2023

(30) Foreign Application Priority Data
Mar. 7, 2020 (DE) .................... 10 2020 106 228.1

(51) Int. Cl.
*G01N 21/84*     (2006.01)
*G06T 7/00*     (2017.01)
*G06T 7/80*     (2017.01)

(52) U.S. Cl.
CPC ....... *G01N 21/8483* (2013.01); *G06T 7/0012* (2013.01); *G06T 7/80* (2017.01);
(Continued)

(58) Field of Classification Search
CPC ..... G01N 21/8483; G06T 7/80; G06T 7/0012; G06T 2207/30072; G06T 2207/30204
See application file for complete search history.

(56) References Cited

U.S. PATENT DOCUMENTS 8,935,007 B2    1/2015    Kloepfer et al.
9,350,956 B2    5/2016    Quilter et al.
(Continued)

FOREIGN PATENT DOCUMENTS

CN      1455242 A    11/2003
EP      1 605 249 B1    4/2014
(Continued)

OTHER PUBLICATIONS

S. Garrido-Jurado et al., "Automatic Generation and Detection of Highly Reliable Fiducial Markers Under Occlusion." Pattern Recognition, vol. 47, No. 6, pp. 2280-2292, 2014.

*Primary Examiner* — Zaihan Jiang
(74) *Attorney, Agent, or Firm* — Blank Rome LLP

(57) ABSTRACT

An analyte testing system for quantifying the presence of an analyte in a specimen by immunochromatography. The system comprises a camera test card, depicting a test cassette (10) with an immunochromatography and a handheld processor device (16) comprising a digital camera (16a), a source of light (16b) and a processor (16c), which software and hardware (16c) are configured to make a pose estimation of camera and object and the measures of light in the region of interest of the immunochromatography. The system allows an automatic camera calibration and certification as a scanner for use in point-of-care diagnostics.

12 Claims, 4 Drawing Sheets

(52) U.S. Cl.
CPC .............. *G06T 2207/30072* (2013.01); *G06T 2207/30204* (2013.01)

(56) References Cited

U.S. PATENT DOCUMENTS

| | | |
|---|---|---|
| 9,390,237 B2 | 7/2016 | Myers et al. |
| 9,410,827 B2 | 8/2016 | Ghazizadeh |
| 9,989,952 B2 | 6/2018 | Ghazizadeh |
| 2004/0029177 A1* | 2/2004 | Nadaoka ............... G01N 33/558 435/7.1 |
| 2006/0088946 A1* | 4/2006 | Willson ............... C12Q 1/6837 436/524 |
| 2008/0118397 A1* | 5/2008 | Slowey ................. B01L 3/5029 422/68.1 |
| 2009/0211345 A1 | 8/2009 | Nahm et al. |
| 2009/0306543 A1* | 12/2009 | Slowey .............. A61B 10/0051 600/576 |
| 2011/0318755 A1* | 12/2011 | Piasio .............. G01N 33/54366 422/417 |
| 2012/0288852 A1* | 11/2012 | Willson ................. G01N 15/10 436/71 |
| 2012/0302456 A1* | 11/2012 | Whitesides ...... G01N 33/54306 435/7.92 |
| 2014/0065647 A1* | 3/2014 | Mamenta ............. G01N 21/274 435/7.92 |
| 2014/0073062 A1* | 3/2014 | Tamura ................ G01N 33/558 436/501 |
| 2014/0213468 A1* | 7/2014 | Ehrenkranz ............ G01N 21/49 436/500 |
| 2017/0336405 A1* | 11/2017 | Paek .................. G01N 21/8483 |
| 2020/0001299 A1 | 1/2020 | Fleming et al. |
| 2020/0057057 A1* | 2/2020 | Limonne ............... G01N 33/558 |
| 2021/0096075 A1* | 4/2021 | Zhou .................. G01N 21/6428 |

FOREIGN PATENT DOCUMENTS

| | | |
|---|---|---|
| EP | 2 835 643 A1 | 2/2015 |
| EP | 2 927 688 A1 | 7/2015 |
| EP | 2 839 280 B1 | 12/2016 |
| EP | 2 839 264 B1 | 7/2017 |
| EP | 2 646 809 B1 | 8/2018 |
| EP | 3 470 825 A1 | 4/2019 |
| EP | 2 923 335 B1 | 3/2020 |
| WO | WO 2005/066624 A1 | 7/2005 |
| WO | WO 2010/118124 A2 | 10/2010 |
| WO | WO-2013/149598 * | 4/2013 |
| WO | WO 2013/149598 A1 | 10/2013 |
| WO | WO 2014/080212 A2 | 5/2014 |
| WO | WO-2019/215199 * | 5/2019 |
| WO | WO-2019/238500 * | 6/2019 |
| WO | WO 2019/215199 A1 | 11/2019 |
| WO | WO 2019/238500 A1 | 12/2019 |

* cited by examiner

CALIBRATION OF A DIGITAL CAMERA FOR USE AS A SCANNER

FIELD OF THE INVENTION

The present invention relates to a system, method and software for analysing and determining by the use of visible optical light the presence and content of an analyte in a test sample which has been subjected to chromatography, in particular lateral flow immunochromatography.

BACKGROUND OF THE INVENTION

Lateral flow immunochromatographic tests are widely used in analytics and diagnostics (cf. to WO/2019/215199 and references cited therein). The result of a lateral flow test is usually determined by a readout of one or more visible coloured lines within a display zone. The intensity of a line that becomes detectable is due to the immobilization of labelled analyte and proportional to the amount of analyte present in the test sample. The optical intensity of a line however cannot be determined easily because dependent on the width of a line as well as on the porosity, thickness and type of the separation material, the pH of the running buffer, temperature, ageing of the test as well as light conditions, eyesight and numerous other factors. Special scanners have been developed for reading the optical intensity of the test response lines under predetermined controlled light conditions. On the other hand, personal digital devices and smart phones could be used for this purpose and would provide additional advantages in point of care diagnostics and telemedicine. Their application is however restricted because of the multifaceted variance of camera quality and the light source (flashlight, smartphone torch). While the popular assay strip formats would provide rapid results, are simple to operate and cost-effective, expensive calibrated scanners and housing devices are still in place for determining the optical intensities of the response lines (cf. CN1455242A, WO2005/066624A1, EP 2 927 688 A1, EP 2 835 643 A1, EP 1 605 249 B1, US20090211345).

U.S. Pat. No. 9,350,956 B2 claims the use of a mobile phone for capturing instant drug test results. WO2010/118124 describes a system for analysing skin and hair samples wherein the image data are sent to a remote server for analysis. U.S. Pat. No. 8,935,007 B2, EP 2 839 264 B1 and EP 2 839 280 B1 disclose a system for point of care diagnostics which is based on a lateral-flow chromatographic test cassette, a smart phone with a digital camera and a software for an interpretation of the digital image. EP 2 646 809 B1 and EP 3 470 825 A1 teach systems wherein the camera software is configured to reject a digital image when a degree of error associated with any rotational misalignment or skew of the imaged test device is greater than a predetermined value. U.S. Pat. No. 9,390,237 B1 (MicroLab Devices Ltd.) and EP 2 923 335 B1 teach a handheld camera system which comprises a computer-implemented perspective transformation of the recorded image on basis of a location information associated with the test cassette. U.S. Pat. No. 9,410,827 B2 and U.S. Pat. No. 9,989,952 B2 claim a system wherein the capturing of a digital image of the test cassette also includes a capturing of calibration data printed on the test cassette. The calibration data is encoded in a two-dimensional barcode and provides directly calibration information of the immunochromatographic assay that can be used for analysis.

When consumer systems such as mobile phones are used in point-of-care diagnostics they must be rated as "medical devices" in accordance with Article 2 of EU Rule 2017/745 which defines as 'medical device' any instrument, apparatus, software, reagent, or article which is intended to be used for human beings for diagnosis, prevention, monitoring, prediction, prognosis, treatment or alleviation of a disease, an injury or disability. This applies also to systems and means for an in vitro examination of specimens derived from the human body. This means that each element of a point-of-care test system requires certification (the (CE) mark in the European Economic Area (EEA). Consequently, there is a need to check, calibrate, record and certify each consumer device and application that will be used in point-of-care diagnostics. On the other hand, smartphone cameras and their light sources (flash lights, smartphone torches) become quickly impaired due to finger tapping and general contamination, and because of the many different brands and editions of mobile phone and their digital camera devices there is great danger of falsified digital images and results. The entire diagnostic system must be considered a joint set of a mobile phone, camera device, camera software and the calibrated lateral flow immunoassay. Such systems may also be used in veterinary diagnostics as well as for food control, environmental analytics and other technical fields. The flow-through immunochromatographic test can be manufactured using a standard procedure and be certified. If a digital image of the very same test is prepared using a digital camera and further processed and scanned for an accurate quantitative result, the entire system and each component must be calibrated, recorded and approved as the camera devices are different. The state of the art therefore represents a problem.

SUMMARY OF THE INVENTION

The objects are achieved by a computer-implemented test system as claimed in claim 1. Another aspect concerns a camera test card for use with the test system of claim 1. Preferred embodiments have been disclosed in the dependent claims.

The present application provides a computer implemented system for determining the concentration of an analyte in a test sample subjected to immunochromatography, the system comprising: (i) a test cassette adapted to house an immunochromatographic test and configured to display a region of interest (ROI) with one or more visible response lines indicating presence and amount of analyte (T) in said test sample and a control line (C), and (ii) a handheld processor device comprising a digital camera, a source of light and a processor, wherein said processor is configured to process digital images captured by said camera (16a) and to represent an analytical result. The system further comprises in accordance with the invention a camera test card depicting one or more test cassettes, and (a) data identifying the camera test card; (b) one or more fiducial markers to allow a finding of correspondences between points on the camera test card and its projected digital image; (c) one or more regions of interest (ROI) showing one or more response lines for test (T) and control (C) comparably printed to the visible response lines of an immunochromatographic test; wherein (d) the processor is configured to analyse sequentially a stream of transient digital images for presence and correspondences several fiducial markers and, if found, (e) calculates a new coordinate system to estimate location, inclination, rotational alignment, skew and distance between the camera test card and said processor device, and if overall pose, angles, and distances ae found within allowed ranges, (f) said processor is configured to examine said transient digital images for a region of interest and its measures of light, as well as for areas of maximum light reflection, and if those are close or within a region of interest (ROI), to offset the handheld processor device by such a degree that the area of maximum light reflection by the light emitted from the light source will lie outside the region of interest (ROI) in order to exclude interfering light reflections on the transient digital image, thereby adjusting the position of the handheld processor device for providing optimized light conditions on the camera text card and within the region of interest (ROI); (g) said processor is further configured to adapt the exposure value (EV) of the digital camera for providing optimized light conditions within the region of interest on the transient digital image; (h) said processor is configured to scan and analyse the region of interest (ROI) on said transient digital image to determine the optical intensities of the response lines for test (T) and control (C), and to record ratio (C/T) of those response lines; (i) said processor is configured to take digital images of another region of interest (ROI) to determine a second intensity ratios (C/T) of other different response lines for test (T) and control (C) and, if both ratios are within allowed ranges, respectively, to set the camera parameters to meet the given range of optical intensities for given different response lines (T), thereby calibrating the digital camera and the light source on basis of a handheld processor device optimally positioned relative to the camera test card, and if the range of optical intensities of the given response lines is within an allowed range, (k) said processor is configured to certify the camera device, light source and software suitable for a medical device for scanning and evaluating an immunochromatographic test for point-of-care diagnostics and telemedicine.

In some embodiments, the camera test card preferably depicts a region of interest (ROI) wherein the response line for test (T) possesses an optical intensity of minimal value and another region of interest (ROI) wherein the response line for test (T) possesses an optical intensity of high value, as well as response lines for control (C) in each region of interest of equal optical intensity.

In some embodiments, the system is based on an immunochromatographic test that is configured to display with any test sample a uniform response line for control (C) which possesses a given optical intensity.

In some preferred embodiments, the system comprises a processor which is configured to forward analytical data to a physician for telemedicine. The processor may also be configured to forward the certification of the digital camera, light source and software to a central unit for storage and/or regular renewal. It is most preferred when the processor is configured to receive instructions for conducting a renewal of certificates, if occasioned by the central unit or the physician.

In some embodiments the processor may be configured to determine the intensity ratios (T/C) of the response lines (T, C) from a number of saved transient images and chooses a median ratio (T/C) for quantitative analysis of the optical intensities of the response lines. This protects the system against arbitrary errors. It is also referred when the processor is configured to correct the region of interest (ROI) for any degree of error in relation to a reference or marker present on the test cassette housing the immunochromatographic test. In some embodiments, the reference or marker may contain a machine-readable representation of data or a link to a data source which provides access to characteristic data of the lateral flow immunochromatographic test.

In some other embodiments, the processor may be configured to employ external data on the location of the region of interest with the visible response lines (T, C).

The immunochromatographic test which is a central part of the system may be for determination in a sample the presence, concentration or amount of faecal calprotectin, serum calprotectin, vitamin D in blood or serum, luteinizing hormone, follicle stimulating hormone, chorionic gonadotropin, thyroid stimulating hormone, albumin, faecal occult blood, gluten immunogenic peptides, bladder cancer marker, *Mycobacterium tuberculosis, Mycobacterium bovis, Mycobacterium africanum, Helicobacter pylori*, Influenza virus A and B, troponin I, *Tinea unguium*, ferritin, D-dimer, C-reactive protein, group A *Streptococcus*, group B *Streptococcus*, genetically modified organisms, allergens present in cereals and products thereof, chickpea and products thereof, peanut and products thereof, hazelnut and products thereof, macadamia and products thereof, mustard and products thereof, soya and products thereof, sesame and products thereof, walnut and products thereof, pistachio and products thereof, lupin and products thereof, celery and products thereof, fish and products thereof, crustaceans and products thereof.

Another aspect of the disclosure is a software for use with a testing system as described for a mobile phone comprising a digital camera, a source of light and a processor, which software supports the taking of digital images, the reading of machine-readable representations of data, an exchange of data and image data with a remote server, and a representation of information, data and test results on a display. The disclosed software may be configured to process sequentially a plurality of transient digital images and analyse each digital image for the presence of a given reference image for pose estimation of the digital camera, and if found and acceptable, said software may be configured to analyse each transient digital image for a region of interest comprising response lines, and if found, said software may be configured to examine each region of interest for the measures of light reflected, as well as for areas of maximum brightness, and if absolute brightness, brightness gradient, areas of dark pixels are found acceptable; said software may be configured to save the image data of said transient digital image for further analysis of the region of interest.

In some embodiments, the software may be configured to determine the optical intensities of the response lines (T, C) within the region of interest; and retrieve calibration data and other deposited data for a determination of a quantitative result of a test sample subjected to an immunochromatographic test.

The provided disclosure is advantageous as it allows the incorporation of mobile phones in systems for point-of-care diagnostics and telemedicine, say when used as a scanner of immunochromatographic tests. The present disclosure provides a smartphone-based system which can be adapted to a plurality of different tests, analytes and test samples and matrices. The immunochromatographic test system no longer requires a visual assessment of the response line nor special equipment (holder, tripod, lamps, distance means, etc.) but can be done anywhere at any time with any test sample. The testing system offers more precise quantitative results in the hands of non-professionals the position and distance of the phone camera as well as the relevant measures of light (brightness and brightness gradient) will become automatically calibrated and adjusted to needs.

The invention will be described with respect to its advantages, favourable embodiments and examples, which shall not be considered limiting. The scope of the invention has been described in the set of claims.

BRIEF DESCRIPTION OF THE DRAWINGS

In the drawings:

—FIG. 1A: negative result on target analyte.

DETAILED DESCRIPTION OF THE EMBODIMENTS

Figure 1A:
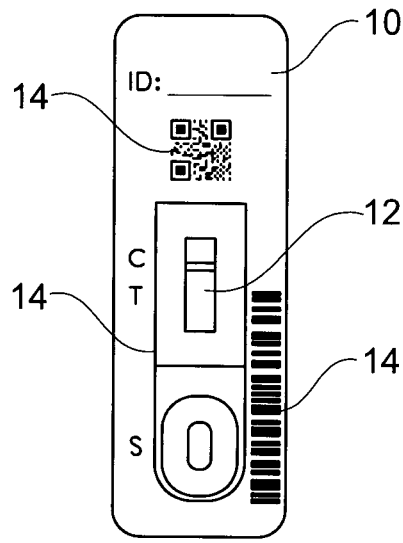
FIG. 1A,B are representations of the upper side of an immunochromatographic test cassette presenting a data matrix, a barcode, a sample application pad (S) and a region of interest with response lines for control and analyte (C—control; T—target analyte)

The system as described provides the advantage that it analyzes the projected transient digital images of a camera test card which are free of non-correctable data and which can be compared with a predefined image of known primary data. Thus, the camera test card allows a multi-dimensional calibration of the system comprising a camera system, a light or torch system, an exposure system as well as a scanner software of the projected image. The transient images data are therefore analyzed, adjusted and calibrated to the camera test card and this step can be done with any smart phone or tablet. Moreover, the transient digital images are prioritized and calibrated for the region of interest only, say for the region containing the visible response line and the signal of the test (analyte) so that the picture data are reduced by 50 to 100 times compared to conventional methods. These systems first select and correct for a "nice picture" of the test cassette (good alignment, contrast, colors) which unavoidably comprises the recording of non-correctable image data prior an assessment of the optical intensities of the visible response lines. Those only correspond with the content of the analyte in the test sample. By prioritizing on the transient image and the non-correctable image data within the region of interest, a data reduction can be achieved since the region of interest represents only a small portion of the entire digital image. Consequently, multiple transient images can be processed even in smart phones with limited internal memory and processing power. Moreover, of the 2 billion cameras manufactured for the phone and tablet market every year, more than half of them have an autofocus. One or more of the lenses in the camera are moved in or out using a microelectromechanical actuator while an algorithm calculates a figure of merit for the sharpness of image for that location of the lenses. The various in-built autofocus algorithms may therefore work conflicting to applications with post-processing algorithms for perspective transform or correction of sharpness or contrast. The system and method described in this application reduces the amount of transient image data which therefore allows an instant assessment of the measures of light within the region of interest. The measures of light within the region of interest are primary optical data which cannot be subsequently corrected by an algorithm since they relate directly to the amount of analyte captured in the response lines. As a sequence of transient images of the region of interest is analyzed, images with poor measures of light reflected can be discarded which lowers the risk of erratic determinations. In other words, the described method analyzes a video stream of the region of interest and only those images for its measures of light which show no exceptional characteristics. This is only possible by reducing the data on the analyzed transient images as well as by making use of the camera characteristics.

This step further requires a precise pose estimation of the heldheld camera device on basis of the projected digital image. This can be done by having several arUco markers or fiducial markers on the camera test card. This is also the initial step for an optimization of the lighting and exposure system which is needed because a focused single light source on a mobile phone may cause interfering reflections on the object and non-homogenous lighting on the region of interest with the response lines. The system processor therefore searches additionally for areas of maximum brightness on the projected image—hereinafter also defined as hotspots—and when one of those hotspots is close to or falls within a region of interest, the ocular picture of the handheld camera which comprises a frame for targeting the real test cassette will be move such that the area of maximum brightness will eventually lie well outside the region of interest, thereby achieving an even lighting of the region of interest. The optimal position of the handheld processor device will then be recorded with respect to one or more reference images on the test cassette (e.g. QR code, bar code, signs or characters) and the region of interest (ROI), also described herein as display or viewport. The region of interest or the display contains one or more visible zones such as bands or lines indicating the presence and content of the analyte (T) in a test sample and a control zone (C). The system comprises in functional co-operation: a portable processor device such as a mobile phone, a digital camera and a source of light. The processor device is configured to process digital images captured by said camera and to represent an analytical result. The processor is further configured to analyse sequentially a plurality of transient digital images for the presence of one or more reference images and, if found and correct, to conduct a pose estimation of the digital camera and the light source, and if within an accepted distance and position, said processor is configured to analyse each transient digital image for the region of interest (ROI) and its measure of light in addition to a search for hotspots (areas of maximum brightness on the projected digital image) whether those are close or within a region of interest, and if this is the case, to move the ocular picture with a frame for the test cassette and/or the region of interest, to such a degree that the actual hotspot will lie well outside the region of interest to obtain a homogenous lighting of the region of interest. Thereafter, the exposure value of the region of interest on the projected digital image will be incrementally lowered until the lighting of the region of interest produces a best result. The best result is obtained with a scanning of the ratio of optical intensities of the response lines for test (T) and control (C) on the projected transient digital image matches the given pinted ratio of the optical intensities for test (T) and control (C) on the camera test card. This procedure is repeated for both mock regions of interest on the camera test card, one having a most faint response line for test (T) and one having a given regular optical intensity for test (T). Consequently, the intensity ratio ($T_{faint}/C_{control}$) represents the optical bottom end of the measurement range and the intensity ratio ($T_{regular}/C_{control}$) provides a two point calibration of the measurement range of the scanning. If the system does not detect the optical bottom end, the camera or lighting is not suitable for scanning of an immunochromatographic test of the invention. The system will fail and not become certified for use with point-of-care diagnostics. If the intensity ratios determined with the camera test card are not within allowed ranges, then the system can not be calibrated and will be rejected. The camera test card can be used for calibration of the real immunochromatographic tests as the response lines for control can be made uniform with any test sample. In other words, the control line is used for a check whether the immunochromatographic test has worked and was done correctly as well as an inherent standard for the optical intensity of the response lines for test ($T_{faint}$ and $T_{regular}$).

When taking the digital images, the camera lens and the internal source of light (flash) must be within an accepted distance to the test device. The camera must be in a position not too close and not too far from the object. If the distance is short the flash would overexpose the object and wet portions on the test strip would be very reflective so that the region of interest can no longer be analysed. If the camera lens and the flash are too far from the object, the region of interest would not become sufficiently illuminated and most importantly, the region of interest would also become too small for analysis. A predefined accepted distance and pose of the camera is needed for obtaining a properly illuminated object as well as for obtaining a region of interest of proper size for determination of the optical intensities of the test and control lines (T, C). If the distance and pose estimation are found acceptable, the region of interest can be easily identified by its distances to the reference signs on the test device. The analysis of the transient digital image for hotspots and for its measures of light have been described above and can then be limited to the region of interest only.

The processor is configured to search for hotspots and to determine the measures of light reflected from the region of interest with respect to absolute brightness, brightness gradient, shadows and areas of dark pixels and combinations thereof. It is functionally important that the processor is configured to retrieve and save multiple approved transient image data of the region of interest so that the optical intensities for test and control (T, C) can be determined from multiple or sets of approved image data. The latter improves greatly the confidence and quality of recorded image data. In a preferred embodiment, the saved digital images are further corrected for any degree of error associated with any rotational misalignment or skew prior a determination of optical intensities for test and control (T, C). This can be done for example on basis of the response lines as those must be in parallel.

The analyte lateral flow test will be employed in a preferred embodiment with a predetermined amount of control to achieve a defined response line for control (C) independently from the presence and content of the analyte in the test sample. The control may be for example an IgG or a chicken IgY which does not recognize or react with the analyte but which is bound at the control line. Thus, the control line will not vary in strength and its strength is independent from the amount of analyte in the test sample. In the alternative, a variance would occur in cases where the sample contained a relatively high amount of analyte. The analyte would be bound by the immunoreactive partner so that there would be less unbound immunoreactive partners available for becoming bound in the control zone. The control zone would then become less intense. This does not happen when a predetermined amount of control is added.

In a most preferred embodiment the processor is configured to determine the intensity ratios (T/C) of the zones (T, C) from a number of saved images and chooses a median ratio (T/C) for quantitative determination of the analyte in the test sample.

When the analyte testing system comprises a test device with a reference image with a machine-readable representation of data (QR-code or bar code) such a code may encode or provide access to characteristic data of the immunochromatographic test on a server, e.g. via internet or by a direct telephone line, which may be used to correlate the determined median intensity ratio (T/C) with a quantitative determination of the analyte in the test sample. In a preferred embodiment, the system is therefore configured to exchange data and image data with a remote server.

The analyte test system may further comprise a processor which is configured to employ data on sharpness and contrast of a displayed reference image or data on the location of the displayed reference image to identify the location of the visible zones (T, C) within the region of interest.

The analyte testing system for assessing the presence of an analyte by lateral flow chromatography comprises a test cassette adapted to house a lateral flow chromatography strip. The strip displays after use one or more visible lines or bands or responsive zones which indicate the presence of the analyte in the test sample and a control. The test cassette may display one or more reference images such as a bar code or QR code, and/or signs and characters. The smart phone must comprise a digital camera, a flash and a processor. The processor is configured to process captured image data of said test cassette, said one or more reference images and of the visible lines, zones or bands for the analyte present in said sample and said control. The processor is adapted to analyze the image data first for one or more reference images to evaluate the distance between the digital camera and the reference image, and if within the predetermined range, said processor is configured to analyze thereafter said image data for the region of interest and/or signals of the visible control, and if found, said processor is configured to analyse said image data for the properties of the light reflected from said chromatography strip (region of interest), and that said processor is configured to reject any image data if the evaluation of any value associated with the properties of light reflected from said chromatography strip is outside a predetermined range so that only captured image data will be retrieved and saved for quantitative analysis of the analyte which image data have been pre-examined as good and valid with respect to the measures of the light reflected from the chromatography strip. The chromatography strip corresponds to region of interest.

Said processor may be configured to analyse the properties of the reflected light with respect to brightness gradient, absolute brightness, shadow, sharpness, absorbance, transmittance, contrast and combinations thereof. Multiple sets of valid image data may be retrieved and saved by the processor device and processed for selecting one set of image data for assessing and quantifying the signal for the analyte. More precisely, said mobile processor device may be configured to capture and retrieve an uneven number of sets of approved image data, preferably from 1 to 13, more preferably from 3 to 11 sets, most preferred from 5 to 9 sets, so that one set can be selected in accordance with a median value. That region of interest can then be used for assessing and quantifying the presence of the analyte in the test sample. The processor may of course also analyse each approved transient image for optical intensities of the visible zones and obtain median values for the T and C zones.

In another embodiment, the reference image may be selected from one or more of printed shapes, logos, bar codes, QR-codes, visible distance lines and dots, boundaries of the cassette, shaping and designs on the housing, chromatographic strip, control lines, shapes and designs on a casing. The reference images may be a data matrix (one or more bar codes or QR codes) comprising calibration information, batch number and/or expiration date of the test or the data needed to access a website which contains all technical data and calibration information on the lateral flow test. The smart phone may be capable of transmitting and receiving data from a remote processing device or server.

In one embodiment, said processor may be configured to determine an error value range with respect to the properties of light received from the region of interest on the test cassette, wherein the error value range is determined by comparing captured image data with predetermined properties of light reflected from the test cassette.

In another embodiment, said processor may be configured to add one or more pixel values in an acquired image region (region of interest) and to identify the location of signals for control and test sample. Said processor may be configured to perform peak searching within the acquired image region (region of interest), the processor being adapted to quantify the intensity of signals for control and test sample by calculating a peak height or peak area, so as to determine the concentration of analyte in the test sample. Said mobile processor device may be configured to employ contrasting colours or items of different proportions printed on a casing or the test cassette or both to compare image data captured by the mobile processing device. Most preferred is a conversion of the RGB data into a grayscale for further analysis and quantitation of the optical intensities of the visible zones (T, C).

In another embodiment, the analyte testing system may be adapted for determining calprotectin, vitamin D, luteinizing hormone, follicle stimulating hormone, chorionic gonadotropin, thyroid stimulating hormone, albumin, faecal occult blood, gluten immunogenic peptides, bladder cancer marker, *Mycobacterium tuberculosis, Mycobacterium bovis, Mycobacterium africanum, Helicobacter pylori*, influenza virus A and B, troponin I, *Tinea unguium*, ferritin, D-dimer, C-reactive protein, group A *Streptococcus*, group B *Streptococcus*, genetically modified organisms, allergens present in cereals and products thereof, chickpea and products thereof, peanut and products thereof, hazelnut and products thereof, macadamia and products thereof, mustard and products thereof, soya and products thereof, sesame and products thereof, walnut and products thereof, pistachio and products thereof, lupin and products thereof, celery and products thereof, fish and products thereof, crustaceans and products thereof.

Another aspect of the disclosure relates to a software for use in a mobile processor device with a digital camera, a source of light and a processor for assessing and quantifying the presence and content of an analyte in a test sample by lateral flow chromatography. Said software may comprise means for imaging a test cassette adapted to house a lateral flow chromatography strip and display one or more visible signals for the presence of analyte in the test sample as well as for control, which test cassette also displays one or more reference images, and wherein said software is configured to process images captured by said camera to obtain image data of said test cassette, said one or more reference images and the visible signals for the analyte present in said sample and for said control, wherein said software is configured to analyze said image data first for one or more reference images to evaluate the distance between the digital camera and the reference image, and if within the predetermined range said software is configured to analyze thereafter said image data for signals of the visible control, and if found said software is configured to analyze said image data for the properties of the light which is reflected from said chromatography strip, wherein said software is configured to reject any image when the evaluation of any value associated with the properties of light reflected from said chromatography strip is outside a predetermined range, so that only captured image data will be retrieved for quantitative analysis of the presence of the analyte, which image data have been pre-examined as good and valid with respect to the properties of the light reflected from the chromatography strip. Said software may be configured to analyze the properties of the light reflection with respect to brightness gradient, absolute brightness, shadow, sharpness, absorbance, contrast and combinations thereof.

A preferred embodiment concerns a software for use in a mobile phone comprising a digital camera, a source of light and a processor, which software supports the taking of digital images, the reading of machine-readable representations of data, an exchange of data and image data with a remote server, and a representation of information, data and test results on a display, wherein the software is configured to process sequentially a number of transient digital images and analyze each digital image for the presence of a reference image with machine-readable data and to determine the distance between said reference image and the digital camera (16a), and if found and acceptable, said software is configured to analyze each transient digital image for a region of interest, and if found, said software is configured to examine each region of interest for the measures of light reflected, and if absolute brightness, brightness gradient, areas of dark pixels are found acceptable; said software is configured to save the image data of said transient digital image for further analysis of the region of interest.

The software is preferably configured to determine the location and optical intensities of the visible zones (T, C) within the region of interest. It may be further configured to retrieve calibration data and other deposited data for a determination of a quantitative result of a test sample subjected to lateral flow chromatography.

The assessment of a visual signal for accurate quantification of an analyte requires first a determination of the distance between the lateral flow chromatography test and the camera, if done with a hand-held optical device, and second a determination of the light conditions on the imaged chromatography and/or test cassette. The image itself may be corrected in arrear as necessary, e.g. in terms of any rotational misalignment or skew, image stabilization, or with respect to the temperature of the light or any tonal data. Even the histogram of an image will be open to post-processing. In terms of a quantitative evaluation of the zones, the histogram or tonal data are of little help if there is a shadow in the region of interest as such a shadow cannot be removed automatically. Thus, the primary measure of light in the region of interest (on the chromatography strip) must be even and good before any reasonable evaluation and quantitative assessment of the zones for test and control. This can be achieved by pre-establishing applicable conditions based on measure of light reflection in the region of interest, say in the region with the coloured bands or zones.

Once the software has determined that the (transient) image has adequate brightness and the distance is within the acceptable range, the transient image is retrieved and saved for post-production and quantitative assessment of the zones. The translation of accepted image data into data on the concentration of the analyte in the test sample can be carried out employing batch- or lot-specific calibration data. The result of the assessment can be stored and/or adequately presented on the screen of the hand-held camera device. The result may be presented on a display or presented with an interpretation. If the hand-held is a smart phone, the so determined concentration of the analyte in the sample may be transmitted to a supervising physician. This may also be obligatory for certain diagnostic analytes and tests. The instant system can advantageously be used in telemedicine and analysis of stool samples. The system relies and been adapted to the typical hardware of smart phones so that no external hardware is required other than the lateral flow test.

The disclosure relates to a system comprising a lateral flow test for use with a personal hand-held camera terminal (smart phone). The system has originally been designed to enable patients and physicians to evaluate objectively the result of a lateral flow chromatography performed on a biological specimen. A representative but difficult biological specimen is stool. Collecting a stool specimen can be a definitive step in determining the diagnosis and appropriate treatment for suspected infectious diarrhea and other gastrointestinal diseases. Stool specimens may also be required for non-microbiological testing, for example fecal immunological testing (FIT) or feacal occult blood tests (FOBT), an early detection method for colorectal cancer, or for proper monitoring the treatment of inflammatory gastrointestinal diseases such as coeliac disease. However, stool specimen collection is challenging, and stool sample are generally or only rarely collected at the doctor's office. Feedback from patients has indicated that they find the process difficult even though early fecal blood screening has been shown e.g. to reduce mortality. Generally, compliance is insufficient (rarely >60%) and reasons given for the lack of patient compliance include inadequate support for returning the collected specimen and embarrassment. It is fact that no patient wishes to drive a distance through their town or over land to handover a specimen of their fresh or frozen stool. Thus, remote analysis in the hands of the patients could represent a solution to these barriers. While the analyte testing system can be easily adapted to numerous other specimens, including food testing, and in other fields such as veterinary, agriculture, horticulture, environmental testing, drug testing, the instant disclosure will focus on the testing of stool as representative example which shall be considered non-limiting.

For analysis of the visual results, color information and/or gray values on the lateral flow test are analyzed via the camera integrated in a mobile phone or hand-held terminal, processed by an algorithm and then given as a numerical value, color code or text. Thus, patients or consumers can carry out such a quantitative lateral flow test themselves, receiving adequate information on the diagnosis or recommendations. In case of critical clinical parameters or analytes, the system may be adapted to and used in combination with automated certificates and authorizations so that the tests and analyses remain under the doctor's supervision. Thus, there may be analytes where simply the concentration of an analyte present in the sample is given and other where the result given to the user is that there is need to come to the doctor's office or hospital. Thus, a smart phone may be required for proper assessment of a disease or whereas the concentration of an allergen or contamination may be given as an absolute value of the analyte content in the sample.

The disclosure further pertains to a monitoring of health disorders, notably chronic gastrointestinal diseases, or an inflammatory status over longer periods of time and the effectiveness of a treatment or medication which may change with time. Results may be visually or numerically displayed as necessary and simultaneously sent to the supervising physician for telemedicine. The system may therefore provide considerable time savings to patients and doctors as unnecessary medical consultations can be avoided. It also reduces embarrassments around stool specimen collection and analysis

DEFINITIONS

In this context, the term "test cassette" refers to any kind of housing or envelope as typically used for a lateral flow chromatography strip. The test cassette may have a plurality of openings to allow an application of liquid with the test sample and a view port for the region displaying the results after separation. The term "test cassette" may also refer to a unit comprising a lateral flow chromatography strip or lateral flow immunoassay.

The term "processor" refers to electronic circuitry that carries out instructions of a computer program by performing arithmetic, logical, control and input/output (I/O) operations specified by the instructions.

The term "reference image" refers to any visually recognizable form, shape and/or data containing code such as, but not restricted to, printed corporate logos, captions, machine readable font, bar codes, QR codes, colour codes, batch designations as well as geometric elements such as distance lines and dots, boundaries, outside edges, inside edges, shaping designs, test, and control lines.

The term "visible signal" refers to any visually recognizable signal, colour, form, shape, geometric structure, line, dot, or response zone which appears on a lateral flow chromatography strip upon performance of a test reaction.

The term "control" refers to any visually recognizable signal, colour, form, shape, geometric structure, line, dot, or zone which confirms that a test has been performed correctly. The disclosure refers to a control zone on the lateral flow test. Conventional lateral flow tests use as control the binding of non-reacted analyte-specific antibodies. More precisely, a zone with immobilised antibodies recognising species- or class-specific antibodies, e.g. immobilised goat antibodies binding to monoclonal mouse anti-analyte antibody.

A preferred embodiment of the disclosure contemplates providing a defined amount of non-analyte specific antibodies in the application pad of the lateral flow test to obtain a control zone of predetermined intensity, an intensity which is independent from the amount of analyte present in the test sample. Consequently, the term "control" not only refers to the conventional control but comprises an "internal standard" for a standard intensity of the visual zone (C) for external and internal calibration.

The term "brightness" stands for an attribute of visual perception in which a source appears shining or reflecting light. In other words, brightness is in the instant disclosure the luminance flux or more precisely, the flux of light which is perceived when looking at the target. The target is in the present application the region of interest of the lateral flow chromatography, hereinafter described as viewport or region of visual interest. The term brightness as used herein comprises the colour appearance of the test and control zones and the typically "white" chromatographic material on the membrane. As is well known, the light reflection or luminance of given target can elicit different perceptions of brightness in different contexts which is why the visual interpretation of the zones of a lateral flow chromatography cannot be easy. It may simply depend on whether the target is still wet or has dried and interpretation will depend on the surrounding light conditions and photographic shadows. Of the various colour appearance models the inventors have preferably programmed the software using the RGB colour space wherein brightness is the arithmetic mean of the red, green, and blue colour coordinates although some of the components make the reflected light appear brighter than others. Most camera software make use of the RGB colour space while there are alternative representations which align better with human vision. The latter however is not relevant for determining the intensity of the signal zones. While it would be nice to use the absolute magnitude of brightness or darkness of the signal zones, the relative values or the ratio between the test and the control zone are used. For determining the brightness of the viewport or region of interest, a further important parameter is the brightness gradient as the "absolute brightness" or luminance (reflected light) must be homogenous over the length and breadth of the region of interest. The brightness is determined by comparison of the brightness of various pixel areas in different regions of the viewport or region of interest. Moreover, the viewport is examined for shadows or untypical dark areas. Consequently, the examination of the brightness of the viewport, its brightness gradient and a search for untypical dark areas (photography shadows) is done on the transient image prior the image data are retrieved and saved for further processing and examination of the visual zones of the lateral flow test.

The term hotspot refers to an area of maximum brightness on the object as well as on the projected digital image which is scanned for areas of maximum brightness. If an area of maximum brightness lies with a region of interest it must be assumed that this is due to a direct reflection of light from a focused source of light of the camera or processor device (flashlight or the torch of the mobile phone).

A shadow is a dark area where light from a light source is blocked by an opaque object. It occupies the volume behind an object being illuminated.

Sharpness (also "acutance") describes a visual perception related to the edge contrast of an image. Sharpness or acutance is related to the amplitude of the derivative of brightness with respect to space.

The term "absorption" as used herein refers to the physical process of absorbing light. Absorbance is the common logarithm of the ratio of incident to transmitted radiant power through a material. It measures attenuation of transmitted radiant power.

Transmittance of the surface of a material is its effectiveness in transmitting radiant energy.

Contrast in visual perception is the difference in appearance of two or more parts of a field seen simultaneously or successively.

The term "transient image" refers to transient data in the volatile memory of the processor for the assessment whether the transient image fulfils the primary condition of light reflection or brightness which allows correlation of image data with an analyte concentration in the test sample. The "transient image" will be cropped and the viewport excised prior retrieval and saving of the "image data." The cutting out of the relevant data will be done using the reference images (data matrix (QR code), bar code, marker lines, etc.) as those are in fixed or know spatial relation to the region of interest or viewport. The data matrix or bar code may also give access to the server for an exchange of data, notably calibration data.

The terms "retrieving", "acquiring", "recordal" or "saving" of image data refers to the process after having validated the image in terms of the measures of light (brightness, brightness gradient, shadows) —and taken from a test cassette that has not expired and for which calibration data can be found on the server.

Figure 4A:
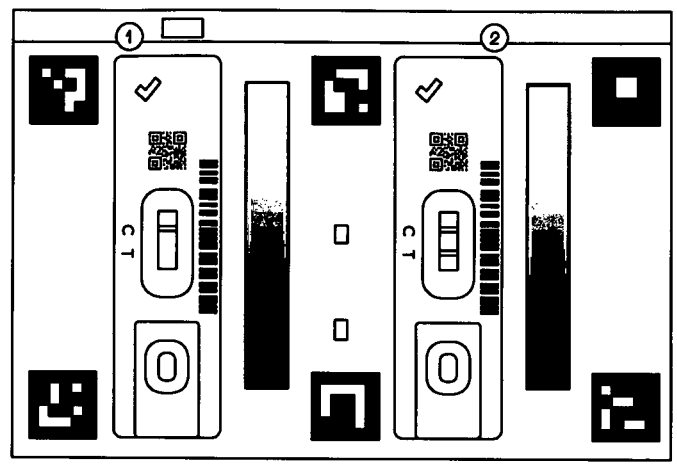
FIG. 4A shows a copier copy of camera test card displaying ArUco markers and representations of two test cassettes displaying regions of interest (viewports): the left test cassette has a region of interest displaying a very faint response line for the test analyte (T) —not visible on the printed copy—and a standardized response line for control (C) and the right test cassette a predefined positive response line (T) and a standardized response line for control (C) —the response lines for control having both (left, right) a predetermined identical optical intensity.

The instant testing system is made up of a software, preferably for a hand-held terminal with a camera or a smart phone, and a co-operating lateral flow test which have both been adapted and designed to meet legal, functional and practical requirements. As the smart phone will be the user's personal smart phone the method must work with the plethora of different types, generations and series of processors and camera devices. Each element of the test kit as well as the application software must therefore be tested with the user's personal smart phone or camera to avoid any harm to the user. The personal smart phone or camera must be checked first and this can be done for the instant system and method with a camera test card as shown in FIGS. 4A and B, having printed thereon regions of interest with defined visible zones (T, C) as well as the permanent reference signs of the test devices. The camera and processor must be able to identify and analyze the region of interest as well as the printed intensities of the visible zones and only when this is performed correctly, the application software will identify the digital camera as approved and acceptable.

Thereafter, the software and/or smart phone may be configured to capture an image from a region of interest of a lateral flow test. For this purpose, the lateral flow strip may be placed in a cassette or envelope with specific openings for a defined application of the test sample and for a read-out of the results within a region of interest. The cassette, housing or envelope is a favourable embodiment for reasons of protection against fingerprints, etc, but no essential feature of the system. The software checks the transient image in respect of the distance between the object (lateral flow test) and the camera and the measures of light in the region of interest and in respect of a subsequent quantification of the analyte prior an image is actually retrieved and saved and subjected to further analysis and quantification of the colouring or optical intensities of the zones. Primary parameters for a quantification of the intensity of the colouring within the test and control zones are the distance and the light conditions in the region of interest on the lateral flow test. Those are relevant for determining the intensity of the visual signals (lines, bands or zones). The measured intensity in the area then relates to the amount of the analyte in question, provided the lateral flow test meets a number of standardizations. Those are lot and production dependent and needs to be determined in advance and carefully determined. A condition sine qua non is that the reproducibility of signal production multiplied with the reproducibility of the amount of sample applied onto the test strip is lower than the allowed error for the quantitation of the analyte. If these conditions are met and an internal reference provided by means of the control zone, the intensities of the test and control zones can be accurately determined even with a "simple" smart phone camera and the ratio of their intensities related to the amount or concentration of the analyte in the sample. The intensities of multiple zones can be used to increase the measurement range. It is easier from a manufacturer's point of view to have multiple test zones rather than controlling the zone breath. The machine-reading of reference images, more precisely of bar codes or data matrices (QR-code) can be used not only for assessing the distance and general light conditions but also for importing data such as lot number, date of expiry, calibration, etc., for further processing of the image and analysis. Accurate results can thereby be obtained, if the visible zones are well lit which is needed for a correct read-out of the signals. The distance between the hand-held camera (processor device) and the object (test cassette or region of interest) must also be as predefined and in the necessary range for a machine-evaluation of the received light on the image.

The present application provides a system and software whereby a mobile phone is upgraded to an analytical or diagnostic tool which provides guidance to users with no technological talent or expertise and can be used by anyone. The software may not merely perform a quantitative analysis of the bands or zones of a lateral flow test but may also give instructions on how to do the lateral flow test correctly and an a preanalytical preparation of a specific biological specimen. With the system of the disclosure, an analytical test can easily be performed at the point of care and the result imaged and quantified almost instantly and/or sent to a remote server. The result may also be passed on by the server to a general physician or medical centre and the server may also provide and/or check for the certificates required for telemedicine. The remote server may undertake an advanced image-processing analysis or provide diagnostic recommendations. The server may also pass on, return or save locally or in the cloud the analysed image and the report for reasons of quality control, statistics, etc. and may also save conditions, parameters or attribute associated with the sample tested (e.g., time, date, person, GPS data, personal data, and other details.

Figure 1B:
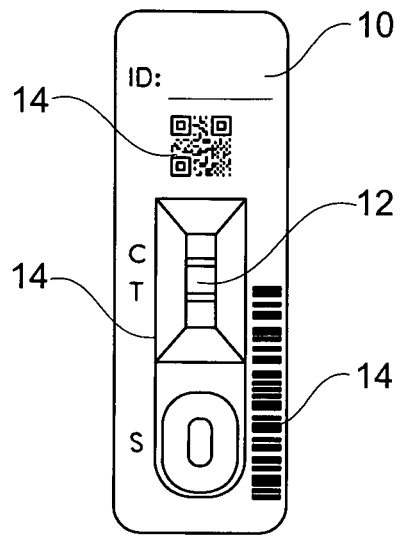
FIG. 1B: positive result on target analyte.

As shown in FIG. 1, the test cassette (10) has an opening for a region of interest or viewport (12) with visible response lines for control (C) and test (T) (FIG. 1A, B). There may be multiple test lines (T) transvers the flow direction to enlarge the measurement range for the analyte. The upper side of the test cassette (10) displays further two types of reference images (14), a data matrix or QR code (top) and a bar code (lower right side). A defined amount of liquid with test sample may be added for chromatographic separation at spot (S) on the application pad.

Figure 2:
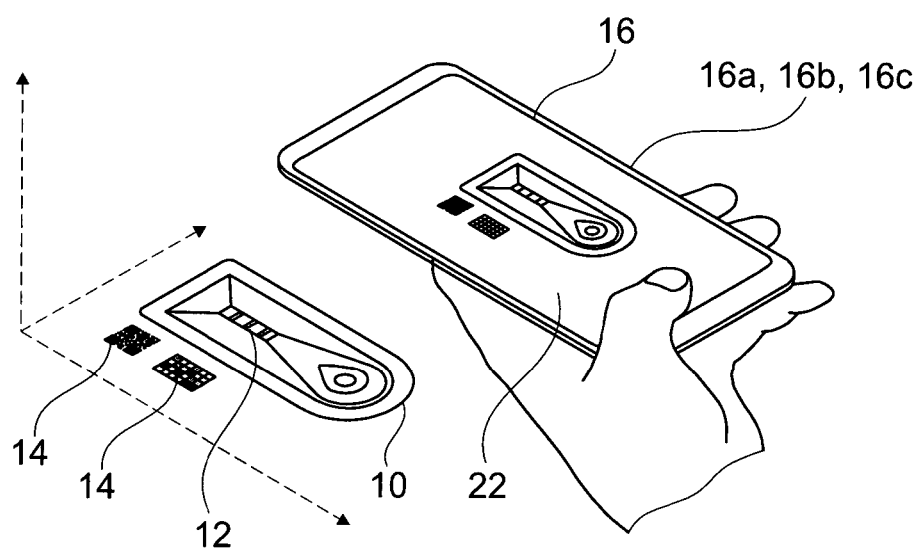
FIG. 2 shows a perspective view of a handheld mobile phone (smart phone with camera and flash light) taking a photo of a immunochromatographic test cassette with test results.

As shown in FIG. 2 the test system comprises a test cassette (10) and a hand-held mobile processor device (16), e.g. a mobile phone (16) with a digital camera (16a) and a screen or display (22) for its user. The mobile phone (16) comprises a source of light (16b) and a processor (16c). The mobile phone (16) captures a transient image comprising the region of interest or viewport (12) and the reference images (14). The transient image can be viewed by the user on the "ocular" display (22) of the smart phone (22) and if distance and the measures of light with the region of interest are correct, the image will be retrieved and saved by the mobile phone. In addition, the mobile phone (16) reads the data contained in the reference signs which provide data to access a server holding data for checking the lot number, expiration dates etc as well as calibration data for an analysis of retrieved and saved image data. The data for accessing the server may be provided in machine-readable form by the references images (14). The reference images—a QR code and a bar code are printed adjacent to test cassette (10) on the casing (18).

In general, the analyte testing system for assessing and quantifying the presence of an analyte in a sample by lateral flow chromatography consists of a test cassette which is adapted to house a lateral flow chromatography strip and display one or more visible zones for the presence of analyte (T) as well as for control (C) and internal standard. The test cassette may also display one or more reference images. The system further consists of a hand-held terminal comprising a digital camera, a source of light and a processor, wherein said processor (16c) is configured to process the transient images captured by said camera (16a) to examine said transient image data of said test cassette and said one or more reference images. Said processor is adapted to analyse said image data first for one or more reference images to evaluate the distance between the digital camera and the reference image, and if within the predetermined range said processor is configured to analyse said image data for measures of light (brightness, brightness gradient, luminance, shadows) in the region of interest or viewport. In other words, said processor is configured to analyse first said image for the properties of light reflected from said chromatography strip before performing any further analyses. Said processor is configured to reject or ignore all images when the evaluation of any value associated with the properties of light reflected from said chromatography strip is outside a predetermined range. Only image data will be retrieved for quantitative analysis which data have been pre-examined as good and valid with respect to the measures of the light reflected from the chromatography strip.

The software may be configured comprising an accepted error or variance range with respect to the properties of the reflected light (luminance). The primary parameters in this connection may be selected from the group comprising absolute brightness (luminance, reflection), brightness gradient within the region of interest (viewport), darkness or dark areas which correspond to photographic shadows in the region of interest. Secondary parameters comprise sharpness, absorbance, transmittance, contrast, and combinations thereof. If the measures are acceptable, the captured transient image is retrieved and can be processed for analysis of the intensity of the visual zones. The software may be configured to sequentially assess brightness and brightness gradients within the viewport area (12). Preferably the software is configured to sequentially assess also for the viewport area (region of interest) for darkness areas (photographic shadows). The software may be further configured to sequentially assess not only brightness, brightness gradient, shadow (dark areas) but also for reflections (areas of isolated high brightness) and sharpness.

Following retrieval of the saved image, the image can be corrected for any misalignment based on the control (C) or reference image (14) on the test cassette (10). It is advantageous to do this step after the assessment of the primary light parameters. Other than in the prior art, the terminal does not acquire images which do not fulfil the predetermined criteria for the measures of light as those cannot be corrected in arrear when a quantification must be done of the intensity of the visual zones. Accurate and predetermined measures of light are essential for a quantitative determination of an analyte by lateral flow chromatography. A subsequent correction of the light properties after image acquisition is always arbitrary and prone to error when the camera software is first preparing a "nice picture" in accordance with photographic criteria. Only an appropriate brightness around and on the visual signals (12) corresponding to control (C) and analyte (T) —and for reference images (14) on the test cassette (10) as well—allow for a true assessment and quantification of the concentration of analyte in the sample.

As mentioned, the reference images (14) may be machine-readable representations of data, e.g. a one or more bar codes and QR codes. The machine-readable data may comprise calibration information, lot number and/or expiration date but it is preferred that the machine-readable data provides the information for accessing a server so that all these data can be exchanged and retrieved from the cloud. The system software may also be configured to transmit acquired image data and test data to a remote processing device. In case of personal data, the system should be provided with certificates and authentication data for a coded transmission of information.

The mobile processing device (16) may be configured to retrieve, save, and/or process an uneven number of images of the viewport and lateral flow test, preferably from 1 to 13 images, more preferably from 3 to 11 images, most preferably from 5 to 9 images, so that the median value for the test zone, more precisely the median T/C, can be used as final test result. Other than prior art, the disclosed system and software does not capture multiple images at different exposure settings and does not combine those to create an image with a "higher dynamic range". In other words, the disclosed system relies on the assessment of an actual image and images with exceptional measure of light and reflections will finally be ignored by choosing the median of a plurality of captured and processed images.

The processor (16c) of the hand-held terminal and processor device (16) may be configured with an allowable for the luminance or brightness on the test cassette (10) or viewport. This implies that the software and device is configured to reject an image only when the measures of light and the luminance within the relevant region are outside the allowable range and/or varies in vertical and longitudinal direction. The allowable error may also be determined from the reference images (14) on the test cassette (10) but this is less preferred because it does not take account of the wetness of the lateral flow chromatography.

In another embodiment, the processor (16c) may be configured to identify the location of zones for control (C) and analyte (T) and perform peak searching to quantify the intensities of the zones for control and target, to determine their ratio either via peak height (preferred) or peak area (integrated signal) or any Gaussian range of the peaks. The concentration of the analyte in the test sample is then determined by correlation with corresponding calibration values.

The software may be used with any handheld terminal having a camera and a source of light. The only other requirement is that the processor device must allow an examination of a sequence of transient images (video sequence) which is primarily a software and no hardware issue. The system can theoretically be used with any commercially lateral flow test with visual bands or signal zones. In practise, the lateral flow test must be standardized most carefully with respect to a constant thickness of the membrane and the separation material thereon as well as with respect to the application pad, the conjugation zone, and the zones with the immobilised receptors. The marker dye must further be selected for producing a visual signal adequately and proportionally. For the sake of accuracy and safety, each POCT may require a machine-readable data matrix or bar code for lot identification so that lot-specific calibration data can be used. The image with the region of interest of the POCT or rapid test is finally retrieved and saved by the processor or camera. The footage is usually returned by the camera in the form of spatially resolved RGB values. This means that for each pixel a value for red, green, and blue is delivered. The calculations can be performed in RGB, HSV, HSL, Lab, CMYK, or any other colour space.

Normalization of the image and elimination of any rotational error can be done in arrear as this merely requires a movement of pixels in accordance with some algorithms. This can be done via a pictogram of the cassette with some pre-programmed virtual pictogram. Other characteristic features of the POCT cassette, which can be used for alignment, are a) print-ons on the cassette such as i) corporate logos ii) captions, iii) machine-readable fonts and batch designations; b) geometric and characteristic borderlines of the test cassette itself such as: i) outside edges, ii) inside edges, and other iii) protrusions of the test cassette. The recorded image may be present at least in a resolution which is sufficient to analyse the visual signal with no distortion. Since the visual signal or zone can be found using the fixed geometric variables of the lateral flow test the orientation of the camera to the lateral flow test can be corrected without impacting the analysis of the visual zones.

The resolution of the cameras is of lesser importance when the intensity ratio (T/C) of the response lines as wells as any rotational misalignment or skew. All fixed information relating to lengths, distances or sizes on the lateral flow test can be pre-programmed and adapted in the software as each lot of devices will require calibration and consequently also an adaptation of the according to the respectively supplied image resolution for each case. scales and proportions.

Figure 3:
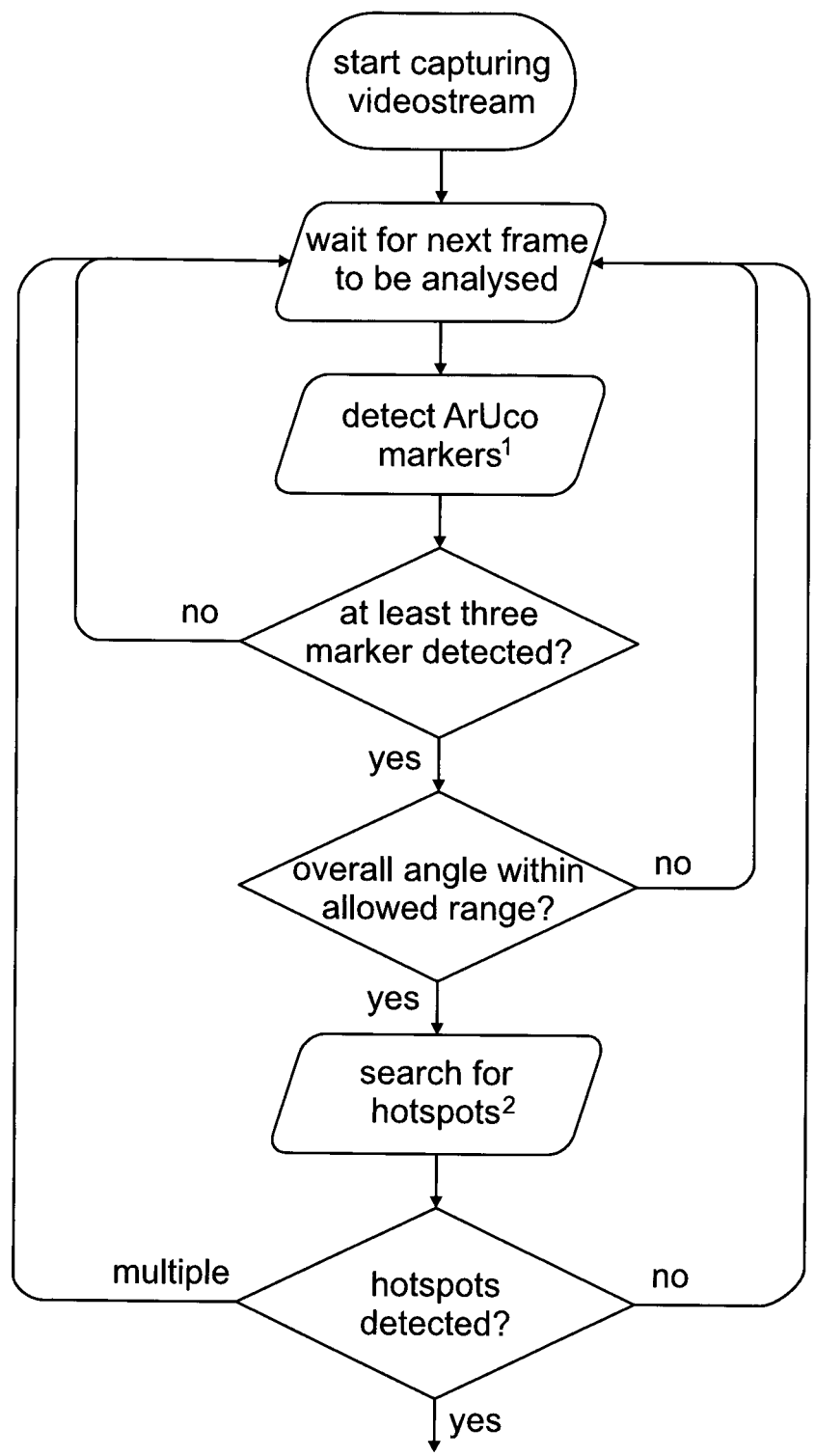
FIG. 3 is a flow chart of the process steps for calibration and certification of a camera device with a light source (flash light, camera torch)
Figure 3:
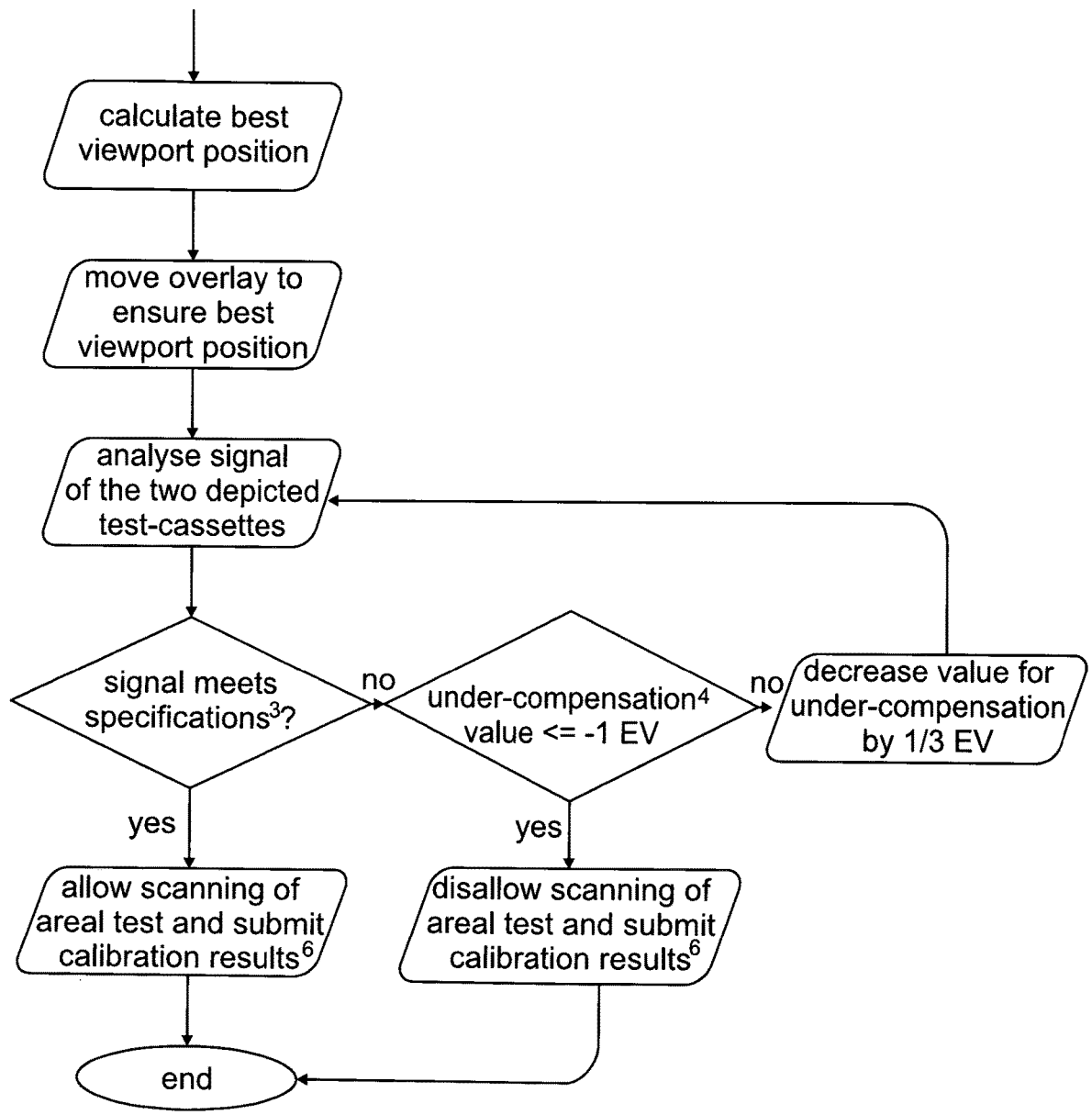

Referring to FIG. 3, the flowchart shows that the device calibration is initiated with a camera test card (device checking card) configured for an identification of so-called hotspots (areas of maximum brightness, vertically reflected light) and for optimising the signal retrieval (signal coverage).

Pose Estimation

For this purpose, the camera test card comprises printed ArUco markers (augmented reality markers or fiducial markers) to determine the position as well as inclination, rotation and skew of the device (smartphone) to the two-dimensional flat surface of the camera test card. This pose estimation of the device is of great importance and is based on finding correspondences between points on the camera test card and its two-dimensional virtual image projection. This difficult step was simplified by having fiducial markers in advance printed on the camera test card to make it easier. The main benefit of binary square fiducial markers can be seen therein that a single marker provides enough correspondences (its four corners) to obtain the camera pose. An ArUco marker is a synthetic square marker composed by a wide black border and an inner binary matrix which determines its identifier (ID). The black border facilitates fast detection in the image and the binary codification allows its identification and the application of error detection and correction techniques. The inner binary codification makes the fiducial marker specially robust because it allows an application of error detection and correction techniques (cf. S. Garrido-Jurado, R. Muñoz-Salinas, F. J. Madrid-Cuevas, and M. J. Marín-Jiménez. 2014. "Automatic generation and detection of highly reliable fiducial markers under occlusion". Pattern Recogn. 47, 6 (June 2014), 2280-2292. DOI=10.1016/j.patcog.2014.01.005). The camera checking card with the binary fiducial markers is preferably a printed cardboard purposively configured, manufactured and printed for device calibration and certification.

Since the accuracy of the system depends significantly on the pose estimation, two different tests are performed to evaluate sources of error. A projection error follows from the system which is reflected in the transformation matrix of the camera to the virtual image. To investigate projection accuracy, the relative position is obtained by detecting the markers in the camera image. The center of the four Aruco markers (or at least three ArUco markers) forms the test card coordinate system, which replaces the world coordinate system. In the test marker coordinate system, four equidistant points around the origin are defined which form the corner points to be projected. The points are then converted to projector image coordinates. A square marker card is distorted using an affine transformation so that it is displayed within these corner points. Ideally, this is a perfect square. The different position and rotation of both marker coordinate system describes the error caused by the projection of the system. Using this method a perfect pose estimation of the smartphone with respect to the camera checking card is possible.

Overexposed Areas (Hotspots)

The pose estimation will then be followed by a search and detection of the so-called camera hotspots. Camera hotspots can be defined as a center point of an area where neighbouring pixels are all at or close to maximum luminance (i.e. total light reflection) which can happen when an object such as the instant camera checking card is illuminated by a bright single or centralised light source, e.g. a flash light or the torch of a smartphone. The magnitude of a hotspot depends or takes into account the area of maximum luminance. The program library OpenCV (open source computer vision) can be used to determine the ellipse out of found contours. The determined rectangular is used to calculate the magnitude of the hotspots, e.g. using the formula sqrt $(w^2+h^2)$, wherein w=width, h=height of said rectangular.

Signal Specifications

Figure 4B:
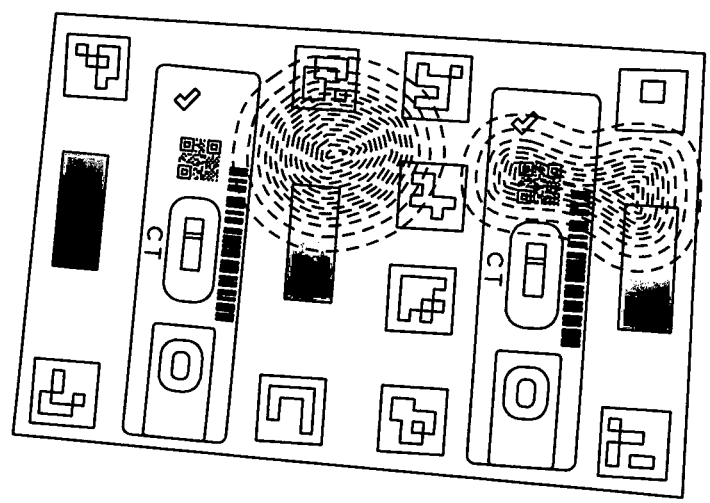
FIG. 4B shows a photo of a printed camera test card taken under real light conditions, employing the automatic exposure value (time, shutter) of the mobile phone—the photo has been taken using the camera flash light/torch. The printed camera test card bears various ArUco markers and printed representations of two test cassettes with different regions of interest (viewports): the left region of interest contains a faintly positive response line for test (T) and a standardized response line for control (C), the right region of interest a fully positive response line for test (T), the response line for control (C) having identical optical intensities in both regions of interest.

We have designed two different camera checks. A camera check is basically an illustration meeting the attributes of a real test cassette (especially the region of interest) in terms of: reflectance, bands, signal intensities. An illustration for a very low and a high signal are provided (see FIG. 4B).

Exposure Compensation

In most circumstances, a low signal can be interpreted as too low due to burned-out pixels, i.e. lost information. As we can not restore such information, the trick is to undercompensate the automatic determined exposure settings by ⅓ EV (i.e. darken the image while it gets captured). With this trick we are able to retain the pixel information in such bright areas, whereas it might be difficult to differentiate.

We do at most three adjustments (−⅓ EV, −⅔ EV, −1 EV).

Calibration

As it should be possible at a certain amount of similar calibration results to enable a device for a given test. In other words: to remove the necessity for the user to do a whole device calibration.

Collection Information:
    determined hotspot (position, magnitude)
    value for under-compensation
    final overlay position
    captured signal values
    images of the final scanned camera checks In order to initially assess the suitability of a transient image: 1. The mobile terminal or processor will independently decide whether the test cassette is correctly distanced to the camera and then batch-specific values will be measured as to the measures of light or the brightness and brightness gradient on the transient image. The implementation may include a registration of the position and size of the machine-readable batch information as well as the size and position of the printed company logo. 2. The user may also check the positions of both relative to the camera based on an overlay displayed on the screen. If brightness and overlay match, this will automatically trigger the recording of the transient image for further analysis of the visual zones. 3. A combination of points 2 and 1 is also contemplated, in which the image of point 2 is checked by the methods of point 1 and, if not satisfied, the image is normalized (scaled, rotated, shifted, or distorted) until the applicable criteria are fulfilled.

A person skilled in the art will appreciate that the framework around the openings and the markers can be used as well to determine focus, skew, positioning, distance, size, and other parameters. The cassette may further have printed on an individual test code in the form of a barcode or a two-dimensional quick reading code (QR) to allow of an external calibration (standard curve).

In a typical embodiment, the lateral flow test for quantitative determination of an analyte in a test sample comprises in fluid communication a sample pad for receiving the sample, a filter pad for filtering the sample and homogenization of the flow-through in wicking direction, a conjugate pad comprising mobile immunoreactants conjugated to a label, a membrane with porous separation material thereon, and a water-adsorptive wicking pad, wherein the separation membrane defines at least one first test zone comprising immobilized capture molecules for the analyte and one second test zone comprising immobilized capture molecules for labelled immunoreactant. It is preferred for the disclosed system that the conjugate pad comprises at least two types of labelled, but immunogenically and functionally distinct mobile immunoreactants, one mobile immunoreactant binding to the analyte to form a labelled complex and the other being inactive with respect to the formation of a complex with the analyte, so that this label reaction in the second test zone will be independent from the reaction of the other labelled immunoreactant with the analyte and the capture of the labelled complex in the first test zone, and whereas the inactive labelled immunoreactant is provided in the conjugate pad in a predetermined amount so as to provide an internal reference (C).

The lateral flow immunoassay format may be chosen from antigen sandwich assay, antibody assay, or competitive hapten assay. In a preferred embodiment, the lateral flow assay is incorporated in a cassette or envelope with defined openings for an application of test sample on the sample pad and for a photographic image of the test zones in a view port. As will be appreciated by a person skilled in the art that the immobilised immunoreactants within the first detection zone may be within two or more lines within the first test zone to provide for a more dynamic range of detection for the analyte. In a most preferred embodiment, the cassette has printed markers which indicate the one or more positions of the first test zone and optionally a marker which indicates the spatial arrangement of the second test zone comprising an internal reference (C) for a proper assessment and evaluation of the zones. In one embodiment, the protein is introduced to the sample pad using a dipstick format and contacting one end of the test device with the protein.

In another embodiment, the protein is applied onto the sample pad using an applicator, for example, a pipette, a syringe, a dropper, etc. The applied amount of fluid is preferably between about 1 and 200 µL, more preferably between about 3 and 100 µL, and most preferably between about 5 and 50 µL. The sample fluid may be selected from the group comprising buffered saline solution, pharmaceutical composition, and biological fluid. The biological fluid directly applied onto the sample pad may be selected from a group comprising blood, plasma, stool extract, faeces fluid, urine, lacrimal fluid, sweat, saliva, and amniotic fluid. The test sample may be a biological fluid of animal or plant origin. The sample fluid may also be processed food and/or mixtures of animal and plant material.

In one embodiment, the conjugate pad of the lateral flow test comprises a detectable marker. The detectable marker in the conjugate pad may be capable of binding the analyte applied on the sample pad. The conjugate pad may further ensure a uniform transfer of the detectable marker and the proteins (analytes) onto the test membrane. In another embodiment, the detectable marker comprises, but is not limited to, particles, luminescent labels, calorimetric labels, fluorescent labels, chemical labels, enzymes, radioactive labels, metal colloids, and chemiluminescent labels. Gold colloidal spheres are most preferred, while other metal sols and latex microparticles may be used as well. Photostable, colour tuneable nanoparticles such as carbon, selenium, or quantum dots have also been used as detectable markers. The detectable marker may also be a secondary protein, e.g. an enzyme, which catalyses a detection reaction, e.g. a colour-reaction.

As mentioned. the test membrane comprises at least one test zone and at least one control zone. Two or more test lines with the test zone may be used when there is a need for an increase quantifiable detection range. The one or more test lines (zone) must be of course upstream of the control zone.

In one embodiment, the analyte testing device may display (a) an individual code which is a barcode or a quick reading QR code, (b) framed openings within a cassette for either access to the sample pad and visual control of the test zones on the membrane, (c) markers on the cassette indicating the locations of the first test zone and the second test zone and (d) a defined area for performing a white balance. The individual code may have e.g. encoded the production lot and the QR-code the data for the calibration and interpretation of the test zone, so that the hand-held camera and processor device is enabled for a stand-alone operation, without internet connection, provided that all other can be downloaded in advance.

Another aspect relates to a method of determining the amount or concentration of an analyte in a test sample using a lateral flow immunoassay, the method comprising: (a) taking a digital image of the lateral flow immunoassay using a camera; (b) analysing the digital image for the location of the second test zone and determining the actual amount of label found in the second test zone on basis of the digital image; (c) comparing the actual amount of label found in the second test zone with a target amount of label in the second test zone to determine the offset of the digital image of the second test zone for one or more colour channels from their respective target values as determined by a calibrated digital image of the second test zone; (e) correcting the actual digital image on basis of the determined offset and further performing a white balance to adjust for the colour temperature of the ambient light and/or supportive flashlight and, optionally, of the optical properties of the camera and lenses used for the taken digital image; (f) analysing the offset-corrected digital image for the location of the first test zone and performing a quantitative determination of the label found in the first test zone; and (g) determining the amount of analyte contained in the test sample by comparison with the values of a series of calibrated standards as determined by lateral flow immunoassays of the same lot of production.

REFERENCE SIGNS

10 Test device
12 Lateral flow test, viewport, region of interest
14 Reference image
T Test zone, response line for analyte
C Control zone, response line for control
S Sample pad
16 Portable processor device
16a Digital camera
16b Source of light
16c Processor
18 Casing
20 Reagents
22 Digital display

The invention claimed is:

1. A computer-implemented system for determining concentration of an analyte in a test sample subjected to immunochromatography, the system comprising:
 a test cassette adapted to house an immunochromatographic test and configured to display a region of interest with one or more visible response lines indicating presence and amount of analyte in said test sample and a control line, and
 a handheld processor device comprising a digital camera, a source of light and a processor, wherein said processor is configured to process digital images captured by said camera and to represent an analytical result, further comprising
 a camera test card depicting one or more test cassettes, and
  (i) data identifying the camera test card;
  (ii) three or more fiducial markers to allow finding of correspondences between points on the camera test card and its projected digital image;
  (iii) two or more regions of interest showing two or more response lines for the test sample and control comparably printed to the visible response lines of an immunochromatographic test;
 wherein the processor is configured to analyze sequentially a stream of transient digital images for presence and correspondences of the three or more fiducial markers,
 said processor is configured to examine said transient digital images for a first region of interest and its measures of light, as well as for areas of maximum light reflection, and if those are close or within the first region of interest, to offset the handheld processor device by such a degree that the areas of maximum light reflection by light emitted from the light source will lie outside the first region of interest in order to exclude interfering light reflections on the transient digital images, thereby adjusting a position of the handheld processor device for providing optimized light conditions on the camera text card and within the first region of interest;

said processor is further configured to adapt an exposure value of the digital camera for providing optimized light conditions within the first region of interest on the transient digital image;

said processor is configured to scan and analyze the first region of interest on said transient digital image to determine optical intensities of the response lines for the test sample and control, and to record a first optical intensity ratio of the optical intensities of the response lines for the test sample and control;

said processor is configured to take digital images of a second region of interest to determine a second optical intensity ratio of other different response lines for the test sample and control and, if both the first and second optical intensity ratios are within allowed ranges, respectively, to set parameters of the camera to meet a range of optical intensities for given different response lines, thereby calibrating the digital camera and the light source on basis of a handheld processor device optimally positioned relative to the camera test card, and if the range of optical intensities of the given response lines is within an allowed range, said processor is configured to certify the camera device, light source and software suitable for a medical device for scanning and evaluating a immunochromatographic test for point-of-care diagnostics and telemedicine.

2. The system as claimed in claim 1, wherein the camera test card depicts a region of interest wherein the response line for the test sample possesses an optical intensity of minimal value and another region of interest wherein the response line for the test sample possesses an optical intensity of high value, as well as response lines for the control in each region of interest of equal optical intensity.

3. The system as claimed in claim 1, which is based on an immunochromatographic test that is configured to display with any test sample a uniform response line for the control which possesses a given optical intensity.

4. The system as claimed in claim 1, wherein the processor is configured to forward analytical data to a physician for telemedicine.

5. The system as claimed in claim 1, wherein the processor is configured to forward the certification of the digital camera, light source, and software to a central unit for storage and/or regular renewal.

6. The system as claimed in claim 1, wherein the processor is configured to receive instructions for conducting a renewal of certificates, occasioned by the central unit or the physician.

7. The system as claimed in claim 1, wherein the processor is configured to determine the intensity ratios of the response lines from a number of saved transient images and chooses a median ratio for quantitative analysis of the optical intensities of the response lines.

8. The system as claimed in claim 1, wherein the digital image of the region of interest is corrected for any degree of error in relation to a reference or marker present on the test cassette housing the immunochromatographic test.

9. The system as claimed in claim 1, wherein the reference or marker contains a machine-readable representation of data or a link to data that encodes or provides access to characteristic data of the lateral flow immunochromatographic test.

10. The system as claimed in claim 1, wherein the processor is configured to employ external data on the location of the region of interest with the visible response lines.

11. The system as claimed in claim 1, further comprising software for use in a mobile phone comprising a digital camera, a source of light and a processor, which software supports the taking of digital images, the reading of machine-readable representations of data, an exchange of data and image data with a remote server, and a representation of information, data and test results on a display, wherein:

the software is configured to process sequentially a number of transient digital images and analyse each digital image for the presence of a given reference image for pose estimation of the digital camera, and if found and acceptable, said software is configured to analyze each transient digital image for a region of interest comprising the response lines, and if found, said software is configured to examine each region of interest for the measures of light reflected, and if absolute brightness, brightness gradient, areas of dark pixels are found acceptable; and said software is configured to save the image data of said transient digital image for further analysis of the region of interest.

12. The system of claim 11, which is configured to determine the optical intensities of the response lines within the region of interest; and further configured to retrieve calibration data and other deposited data for a determination of a quantitative result of a test sample subjected to an immunochromatographic test.

* * * * *